United States Patent
Jung et al.

(10) Patent No.: US 12,500,689 B2
(45) Date of Patent: Dec. 16, 2025

(54) COMMUNICATION ISOLATOR FOR CYBER SECURITY AND COMMUNICATION ISOLATION METHOD OF THE COMMUNICATION ISOLATOR

(71) Applicant: KEPCO ENGINEERING & CONSTRUCTION COMPANY, INC., Gimcheon-si (KR)

(72) Inventors: Seung Ha Jung, Gimcheon-si (KR); Ji Wung Park, Gimcheon-si (KR); Won Young Lee, Gimcheon-si (KR)

(73) Assignee: KEPCO ENGINEERING & CONSTRUCTION COMPANY, INC., Gimcheon-si (KR)

( * ) Notice: Subject to any disclaimer, the term of this patent is extended or adjusted under 35 U.S.C. 154(b) by 543 days.

(21) Appl. No.: 17/890,549

(22) Filed: Aug. 18, 2022

(65) Prior Publication Data
US 2024/0063939 A1    Feb. 22, 2024

(30) Foreign Application Priority Data

Aug. 19, 2021   (KR) .................. 10-2021-0109637

(51) Int. Cl.
*H04B 1/44*   (2006.01)
*G06F 7/00*   (2006.01)
*G06F 13/38*   (2006.01)
*H04B 10/07*   (2013.01)
(Continued)

(52) U.S. Cl.
CPC .......... *H04L 1/0016* (2013.01); *H04L 1/0052* (2013.01)

(58) Field of Classification Search
CPC ... H04L 1/0045; H04L 1/0016; H04L 67/565; H04L 9/0618; H04L 1/0041; H04L 1/0052
(Continued)

(56) References Cited

U.S. PATENT DOCUMENTS 9,465,371 B2    10/2016 Jung et al.
2006/0111060 A1* 5/2006 Kuriyama ............ H03G 3/3042
                                                    455/127.2
(Continued)

FOREIGN PATENT DOCUMENTS

CN    112073375 A    12/2020
KR    2013-0096603   8/2013
(Continued)

OTHER PUBLICATIONS

Korean Office Action for Application No. 10-2021-0109637, Issue Jan. 7, 2023 (8 pages).
(Continued)

*Primary Examiner* — Marcus Smith
*Assistant Examiner* — Jason A Harley
(74) *Attorney, Agent, or Firm* — Nixon Peabody LLP; Jeffrey L. Costellia (57) ABSTRACT

A communication isolator configured to perform network communication with a first control system and a second control system includes a first communication device configured to receive a first communication signal corresponding to a first signal with respect to an output from the first control system, obtain first data by decoding the first communication signal, and generate a second signal corresponding to the first data by using a pre-stored look-up table, and a second communication device configured to receive the second signal from the first communication device, convert the second signal into second data by using the look-up table, encode the second data into a second communication signal, and transmit the second communication signal to the second control system.

8 Claims, 7 Drawing Sheets

(51) Int. Cl.
  *H04B 10/079* (2013.01)
  *H04L 1/00* (2006.01)
  *H04M 1/72409* (2021.01)
  *H04M 7/04* (2006.01)
(58) Field of Classification Search
  USPC .................................................. 370/428, 419
  See application file for complete search history.

(56) References Cited

U.S. PATENT DOCUMENTS

| | | | | |
|---|---|---|---|---|
| 2009/0079612 | A1* | 3/2009 | Parfitt | G05B 19/054 341/157 |
| 2014/0195845 | A1* | 7/2014 | Phan | G06F 11/0793 714/2 |
| 2016/0092386 | A1* | 3/2016 | Sakamoto | G06F 13/426 710/106 |
| 2017/0244677 | A1* | 8/2017 | Lee | H04L 9/002 |
| 2018/0115322 | A1* | 4/2018 | Fukui | H03M 7/42 |
| 2018/0239719 | A1* | 8/2018 | Soffer | G06F 13/4022 |
| 2022/0173948 | A1* | 6/2022 | Schultze | H04L 1/0042 |
| 2022/0345888 | A1* | 10/2022 | Yu | H04W 12/08 |
| 2023/0198781 | A1* | 6/2023 | Anderson | H04L 9/0618 713/156 |
| 2023/0342762 | A1* | 10/2023 | Shamai | G06F 21/64 |

FOREIGN PATENT DOCUMENTS

| | | |
|---|---|---|
| KR | 2017-0097509 | 8/2017 |
| KR | 2017-0124793 | 11/2017 |

OTHER PUBLICATIONS

Office Action in Chinese Patent Application No. 202210996419.1 with English Translation, mailed May 14, 2025, (14 pages).

* cited by examiner

COMMUNICATION ISOLATOR FOR CYBER SECURITY AND COMMUNICATION ISOLATION METHOD OF THE COMMUNICATION ISOLATOR

CROSS-REFERENCE TO RELATED APPLICATION

This application is based on and claims priority under 35 U.S.C. § 119 to Korean Patent Application No. 10-2021-0109637, filed on Aug. 19, 2021, in the Korean Intellectual Property Office, the disclosure of which is incorporated by reference herein in its entirety.

BACKGROUND

1. Field

One or more embodiments relate to a communication isolator for cyber security and a communication isolation method of the communication isolator, and more particularly, to a method and apparatus to protect a security area from a control area so that even when sabotage occurs in the security area, an important system of the security area is protected by using a physical method.

2. Description of the Related Art

Cyber security has become an important issue in industries and national security facilities. Accordingly, the need has arisen to pay attention to intrusion of non-authenticated parties from a control area, which is a non-security area, into a security area, or cyber terrorism that may cause substantial damage to important systems in the security area.

A method of installing a software firewall or setting an alert for an operator for a situation in which abnormal traffic is sensed, in order to monitor and defend an intrusion from a control area into a security area, and a uni-directional signal-transmission method by which a uni-directional diode is physically formed and signals are transmitted only in a direction from a security area to a control area have been used.

However, according to these methods, a feedback signal with respect to whether or not a network normally operates may not be received, and thus, the reliability of the network and signals may deteriorate.

SUMMARY

An objective of the disclosure is to guarantee the operation integrity of a control system formed in an industrial site by physically isolating communication between the control system formed in the industrial site and another controller formed outside the industrial site.

Also, an objective of the disclosure is to minimize damage, such as a virus, etc., while providing bi-directional communication, unlike a firewall based on a data diode, a commercial technology providing only uni-directional communication.

Also, an objective of the disclosure is to provide a function of safe data transmission between a central controller and an external controller.

Also, an objective of the disclosure is to provide bi-directional communication via conversion of a digital signal and an analog signal into an electrical signal.

Also, an objective of the disclosure is to transmit and receive a sound signal without hindering bi-directional communication.

Additional aspects will be set forth in part in the description which follows and, in part, will be apparent from the description, or may be learned by practice of the presented embodiments of the disclosure.

According to one or more embodiments, a communication isolator configured to perform network communication with a first control system and a second control system includes a first communication device configured to receive a first communication signal corresponding to a first signal with respect to an output from the first control system, obtain first data by decoding the first communication signal, and generate a second signal corresponding to the first data by using a pre-stored look-up table, and a second communication device configured to receive the second signal from the first communication device, convert the second signal into second data by using the look-up table, encode the second data into a second communication signal, and transmit the second communication signal to the second control system.

The second communication device may further be configured to receive a third communication signal corresponding to a first command signal from the second control system, convert the third communication signal into third data by decoding the third communication signal, generate a third signal corresponding to the third data by using the look-up table, and transmit the third signal to the first communication device, and the first communication device may further be configured to convert the third signal into a fourth communication signal and transmit the fourth communication signal to the first control system, and the first control system is configured to generate a command signal corresponding to the fourth communication signal.

The first communication device and the second communication device may be connected to each other by a hardwire cable and may exchange a signal with each other.

The output of the first signal may correspond to a measurement value or a control signal corresponding to the first signal.

The first communication device may further be configured not to generate the second signal, when there is no value in the look-up table corresponding to the first data.

The first communication device or the second communication device may be firmware.

According to one or more embodiments, a communication isolation method of a communication isolator configured to perform network communication with a first control system and a second control system includes receiving, via a first communication device of the communication isolator, a first communication signal corresponding to a first signal with respect to an output from the first control system, obtaining, via the first communication device, first data by decoding the first communication signal, generating, via the first communication device, a second signal corresponding to the first data by using a pre-stored look-up table, receiving, via a second communication device of the communication isolator, the second signal from the first communication device, converting, via the second communication device, the second signal into second data by using the look-up table and encoding, via the second communication device, the second data into a second communication signal, and transmitting, via the second communication device, the second communication signal to the second control system.

The communication isolation method may further include, receiving, via the second communication device from the second control system, a third communication signal corresponding to a first command signal, converting, via the second communication device, the third communication signal into third data by decoding the third communication signal, generating, via the second communication device, a third signal corresponding to the third data by using the look-up table, and transmitting, via the second communication device, the third signal to the first communication device, and converting, via the first communication device, the third signal into a fourth communication signal and transmitting, via the first communication device, the fourth communication signal to the first control system, and generating, via an external controller, a command signal corresponding to the fourth communication signal.

The first communication device and the second communication device may be connected to each other by a hardwire cable and may exchange a signal with each other.

The output of the first signal may correspond to a measurement value or a control signal corresponding to the first signal.

The first communication device may be configured not to generate the second signal, when there is no value in the look-up table corresponding to the first data.

According to one or more embodiments, a non-transitory computer program may be stored in a medium to execute, on a computer, a method of any one of methods according to an embodiment.

In addition, other methods and systems to implement the disclosure and a computer-readable recording medium having recorded thereon a computer program for executing the method are further provided.

Other aspects, features, and advantages in addition to the described above may become apparent from the drawings, the scope of claims, and the detailed descriptions of the disclosure below.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, the structures and operations of the disclosure will be described in detail with reference to embodiments illustrated in the accompanying drawings.

Various modifications may be made to the disclosure, and the disclosure may have various embodiments, and thus, one or more embodiments are shown by way of example in the drawings and will herein be described in detail. The effects and the characteristics of the disclosure, and methods of realizing the same will become apparent by referring to the drawings and embodiments described in detail below. However, the disclosure is not limited to the embodiments disclosed below and may be realized in various forms.

Hereinafter, embodiments will be described in detail by referring to the accompanying drawings. When describing the embodiments with reference to the drawings, the same reference numerals are given to components that are the same or substantially the same, and their descriptions will not be repeated.

In the embodiments described hereinafter, the terms "first," "second," etc. are not used in a restrictive sense, but are only used to distinguish one component from another component.

As used herein, the singular expressions "a," "an," and "the" are intended to include the plural forms as well, unless the context clearly indicates otherwise.

It will be further understood that the terms "comprises" and/or "comprising" used herein specify the presence of stated features or components, but do not preclude the presence or addition of one or more other features or components.

For convenience of explanation, sizes of elements in the drawings may be exaggerated or reduced. For example, sizes and thicknesses of the elements in the drawings are randomly indicated for convenience of explanation, and thus, the disclosure is not necessarily limited to the illustrations of the drawings.

When some embodiments can be implemented differently, specific process orders may be different from the described order. For example, two consecutively described processes may be performed substantially simultaneously or in an order opposite to the described order.

A communication isolator according to embodiments is a device for protecting a security area from a control area (a non-security area), and when sabotage (cyber terrorism) occurs in the security area, the communication isolator is capable of protecting an important system of the security area by using a physical method that selectively blocks generated signals. The communication isolator according to embodiments may not allow communication except for designated signals, and thus, may prevent cyber terrorism attacks and damage to a network system.

Figure 1:
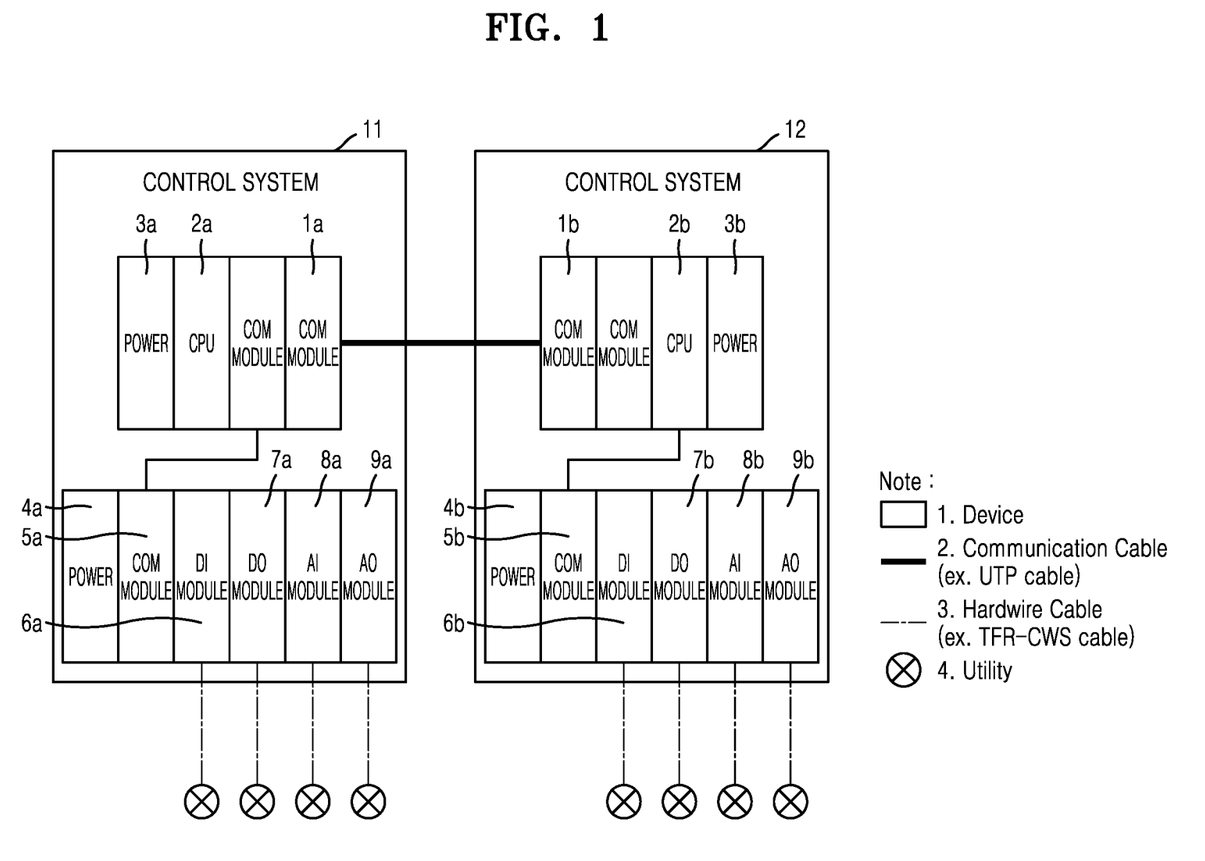
FIG. 1 is a diagram of a central controller and a sub-controller according to the related art.

FIG. 1 is a diagram of a central controller and a sub-controller according to the related art.

An automated system formed in factories, etc. may include a central controller and a plurality of sub-controllers. The central controller may exchange information with the plurality of sub-controllers, control the plurality of sub-controllers, and monitor the plurality of sub-controllers, through communication with the plurality of sub-controllers. The central controller may be connected with the plurality of sub-controllers and may exchange information with the plurality of sub-controllers by communicating with the plurality of sub-controllers.

The central controller may transmit and receive data to and from the plurality of sub-controllers and may control and monitor the plurality of sub-controllers, through communication The central controller may be connected with an external controller. Also, the external controller may transmit, to the central controller, a control signal and a monitoring signal with respect to a measuring device and an apparatus of a site. Here, the plurality of sub-controllers that are added may be provided for a purpose of a system, a distance limitation, a hierarchical independence, an expansion limitation, etc.

The external controller and/or the plurality of sub-controllers, connected with the central controller, may exchange control signals with the central controller through communication. When the control signals between the external controller and/or the plurality of sub-controllers, connected with the central controller, and the central controller are limitlessly transmitted and received, viruses and control signals of cyberattacks may also be exchanged therebetween. In this case, when the central controller receives a control signal contaminated by a virus and/or a control signal of a cyberattack, the central controller may be contaminated by the virus and/or affected by the cyberattack and may not maintain the communication integrity.

Also, each of the external controller and the sub-controllers connected with the central controller of the automated system may exchange its control information with the central controller through communication. In detail, the central controller may transmit its control information to the external controller or the sub-controllers. Here, when the control information is transmitted to the external controller or the sub-controllers affected by a virus and/or a cyberattack, the control information may be exposed to the outside through the external controller or the sub-controllers.

Also, when a party that is non-authenticated with respect to a communication network intrudes into the automated system, the central controller, the external controller, and the sub-controllers may be grasped by the non-authenticated party. When the central controller, the external controller, and the sub-controllers are grasped by the party without authentication, important information of the central controller, the external controller, and the sub-controllers may be exposed to the non-authenticated party. To protect the automated system from this danger, a program, such as a firewall, may be used. However, although the program, such as the firewall, may defend the automated system from an attack from the outside, only posthumous handling is possible with respect to an offense already committed.

After a malicious code, virus contamination, cyber terrorism, etc. occur with respect to the sub-controllers or the external controller, connected with the central controller, damage having already occurred may not be restored. To solve this problem, a communication isolator 100 according to embodiments may be designed to exchange only pre-defined control information and control signals and isolate control information and control signals that are not pre-defined, so as not to exchange the control information and the control signals that are not pre-defined, and tackle an offence, such as cyber terrorism.

Figure 2:
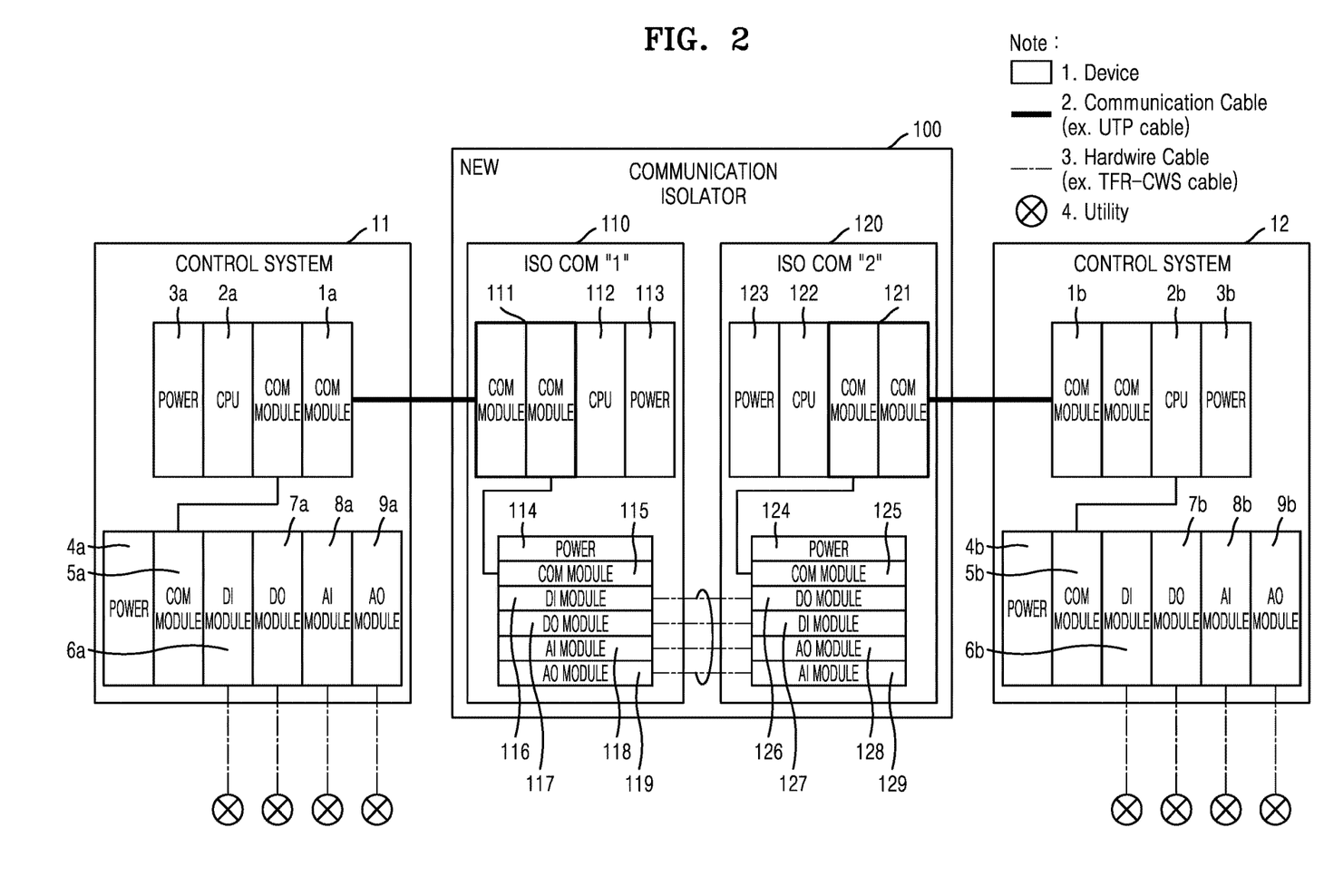
FIG. 2 is a diagram of a communication isolator according to embodiments.

FIG. 2 is a block diagram of the communication isolator 100 according to embodiments.

The communication isolator 100 may be configured to connect between the central controller and the sub-controllers or between the central controller and the external controller only through digital signals (a digital input signal (DI) and a digital output signal (DO)) or analog signals (an analog input signal (AI) and an analog output signal (AO)). The communication isolator 100 may be implemented in hardware or software. The communication isolator 100 may isolate a network between the central controller and the sub-controllers and a network between the central controller and the external controller. A first control system 11 of FIG. 2 may correspond to the external controller or the sub-controllers, and a second control system 12 of FIG. 2 may correspond to the central controller, but the first and second control systems 11 and 12 are not limited thereto and may correspond to various control systems.

Based on this configuration, the communication isolator 100 may obtain the integrity and the reliability of information with respect to the central controller. Through the communication isolator 100, the transfer of a virus intrusion, cyber terrorism, hacking, etc. affecting the sub-controllers, the external controller, and an external computer to the central controller may be basically prevented. While the communication isolator 100 may block the virus intrusion, cyber terrorism, hacking, etc., the communication isolator 100 may also enable bi-directional communication between the central controller and the sub-controllers and between the central controller and the external controller.

The communication isolator 100 according to embodiments may be replaced by an information communication monitoring device. According to another embodiment, the communication isolator 100 may be connected between a computer in a security area and an internal converter in a control area, but is not limited thereto. The computer in the security area may correspond to the second control system 12 of FIG. 2, and the internal converter in the control area may correspond to the first control system 11 of FIG. 2, but embodiments are not limited thereto.

The computer in the security area and the internal converter in the control area may be connected by a communication cable, and signals to be communicated from the control area may be selected in advance.

The computer in the security area and the internal converter in the control area may exchange a digital signal or an analog signal.

The internal converter in the control area may generate digital signals (0 V to 5 V) or analog signals (4 mA to 20 mA) as an output signal. The output signal generated like this may be transmitted through the communication isolator 100. The communication isolator 100 may be configured such that signals from among output signals, except for the predetermined digital signals (0 V to 5 V) or the predetermined analog signals (4 mA to 20 mA), may not be communicated between a system in the security area and a system in the control area. The communication isolator 100 may isolate the other signals except for the predetermined digital signals (0 V to 5 V) and the predetermined analog signals (4 mA to 20 mA) so that the other signals are not to be exchanged between the system in the security area and the system in the control area system. The digital signals (0 V to 5 V) or the analog signals (4 mA to 20 mA) are only an example, and signals for which communication is available may be defined based on various references. Here, the pre-defined digital or analog signals may be determined by voltage values or current values, but are not limited thereto and may be determined by various references. The digital signals or the analog signals may be determined by the voltage values or the current values that are different for each reception device.

The first control system 11 arranged in the control area or the external controller may include a first communication module 1a, a central processing unit (CPU) module 2a, a first power module 3a, a second power module 4a, a second communication module 5a, a digital input module 6a, a digital output module 7a, an analog input module 8a, and an analog output module 9a. The second control system 12 may include a first communication module 1b, a CPU module 2b, a first power module 3b, a second power module 4b, a second communication module 5b, a digital input module 6b, a digital output module 7b, an analog input module 8b, and an analog output module 9b.

The first communication module 1a of the first control system 11 may perform a function of transmitting a signal to the second control system 12 or the external device, and the second communication module 5a of the first control system 11 may perform a function of communicating with at least one of the digital input module 6a, the digital output module 7a, the analog input module 8a, and the analog output module 9a in the first control system 11.

The first communication module 1b of the second control system 12 may perform a function of transmitting a signal to the first control system 11 or the external device, and the second communication module 5b of the second control system 12 may perform a function of communicating with at least one of the digital input module 6b, the digital output module 7b, the analog input module 8b, and the analog output module 9b in the second control system 12.

FIG. 2 is a diagram of the communication isolator 100 according to embodiments.

The communication isolator 100 may include a first communication device 110 and a second communication device 120. The first communication device 110 and the second communication device 120 may be connected to each other through a wired or wireless network or an electrical cable and may be embodied in a single chip set. Each of the first communication device 110 and the second communication device 120 may be embodied in an individual chip set. The communication isolator 100 may operate by being connected to communication cables between control systems connected through a network.

Communication signals and/or data transmitted and received between the control systems may be transmitted and received through the communication isolator 100. The communication signals and/or the data between the control systems may have a predetermined data format.

As illustrated in FIG. 2, the communication isolator 100 may include the first communication device 110 and the second communication device 120. The first communication device 110 and the second communication device 120 may be connected with each other through a communication cable.

In detail, the first communication device 110 may include a first communication module 111, a CPU module 112, a first power module 113, a second power module 114, a second communication module 115, a DI module 116, a DO module 117, an AI module 118, and an AO module 119.

The first communication module 111 may communicate with the first control system 11 and may transmit and receive data or signals transmitted to or from the first control system 11. The first communication device 110 and the second communication device 120 may be connected with each other by a hardwire cable, a tray flame-retardant PVC sheathed copper tape shield control cable, or a TRF-CVVS cable, but are not limited thereto and may be connected with each other by various cables.

At least one of the DI module 116, the DO module 117, the AI module 118, and the AO module 119 may be controlled by the CPU module 112. Signals generated in at least one of the DI module 116, the DO module 117, the AI module 118, and the AO module 119 may be encoded or decoded according to control by the CPU module 112.

The second communication device 120 may include a first communication module 121, a CPU module 122, a first power module 123, a second power module 124, a second communication module 125, a DO module 126, a DI module 127, an AO module 128, and an AI module 129.

The first communication module 121 may communicate with the second control system 12 and may transmit and receive data, signals, etc. to and from the second control system 12.

At least one of the DO module 126, the DI module 127, the AO module 128, and the AI module 129 may be controlled by the CPU module 112. Signals generated in at least one of the DO module 126, the DI module 127, the AO module 128, and the AI module 129 may be encoded or decoded according to control by the CPU module 112.

The first communication device 110 and the second communication device 120 may be electrically connected with each other and may exchange electrical signals with each other.

Here, the generated electrical signals may include a DI, a DO, an AI, an AO, etc. A transmission flow of the electrical signals is described as below.

Figure 3:
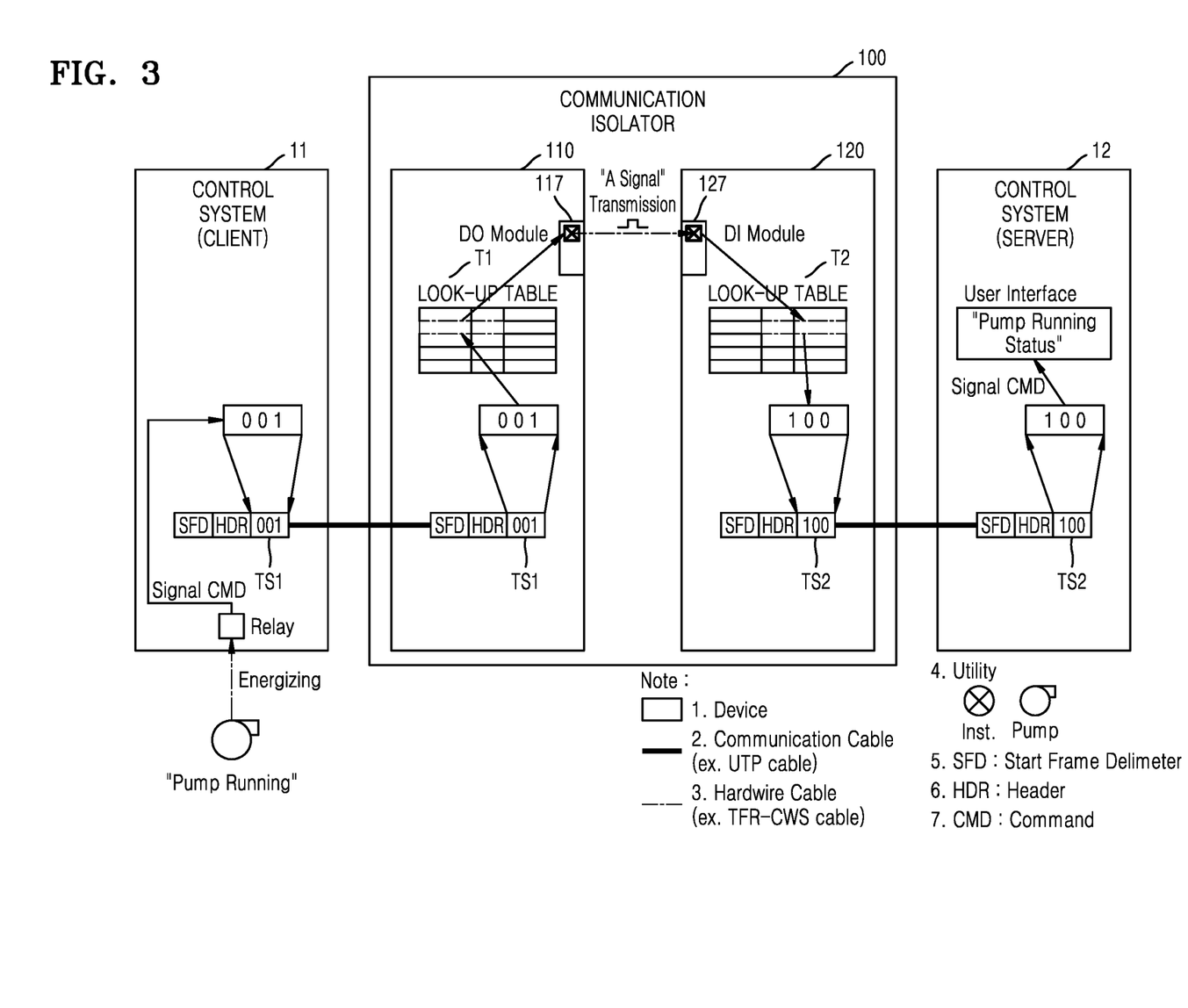
FIG. 3 is a diagram for describing a process in which a digital input signal of a first control system is transmitted to a second control system through a communication isolator.

FIG. 3 is a diagram for describing a process in which a DI of the first control system 11 is transmitted to the second control system 12 through the communication isolator 100.

The first control system 11 may operate as a client with respect to a DI component. When a pump in a site is in a running state, a point of contact may be touched and energized so as to be input as an internal signal. The DI signal may refer to a signal transmitted from the first control system 11 to the communication isolator 100. The input signal may include data, and the data included in the input signal may be converted into a communicable communication signal by encoding or encapsulation. The converted communication signal may be transmitted to the communication isolator 100. Here, it is described that the data is converted into the communication signal, but it is not limited thereto, and the data may be converted into various formats in which communication is possible. Here, the communication signal refers to a signal transmitted from the first control system 11 to the communication isolator 100.

The first communication device 110 of the communication isolator 100 may obtain and determine data (a value) included in a first communication signal TS1 by decoding or decapsulating the first communication signal TS1. Here, the first communication signal TS1 refers to a signal transmitted from the first control system 11 to the communication isolator 100. Here, the data (the value) may be an arbitrary number corresponding to a bit string of a binary system included in the signal.

The first communication device 110 of the communication isolator 100 may generate a signal corresponding to the data obtained from the first communication signal TS1 and may transmit the signal to the second communication device 120. The first communication device 110 may determine whether the data obtained from the first communication signal TS1 is data stored in a first look-up table T1. When the first communication device 110 does not identify corresponding data in the first look-up table T1, the first communication device 110 may not process the received signal. That is, the first communication device 110 may not generate the signal corresponding to the first communication signal TS1.

Here, the first look-up table T1 may be changed by a manager as communication is proceeded. For example, when non-configured data is received, it may be determined that it may be needed to transmit the corresponding non-configured data to another control system. The non-configured data may be defined in the first look-up table T1. Here, the communication isolator 100 may change the first look-up table T1 such that the first look-up table T1 includes a corresponding module and a corresponding value with respect to the corresponding data.

The second communication device 120 may obtain data by using the received signal and a pre-stored second look-up table T2 and may generate a second communication signal to include the data. Here, the second communication signal refers to a signal transmitted from the communication isolator 100 to the second control system 12. The DO module 126 of the second communication device 120 may transmit a communication signal to the second control system 12. The second look-up table T2 may include a signal, data corresponding to the signal, or information about a corresponding module. Dada related to a digital signal and information about a module to transmit the digital signal may be managed by using the second look-up table T2.

For example, when an electrical signal of 0 V to 5 V is generated by the first communication signal TS1 in the first communication device 110, the DI module 127 of the second communication device 120 may sense the first communication signal TS1 though an electrical cable, such as a hardwire cable, or a communication cable (e.g., an unshielded twisted pair cable (UTP) cable), and the DI module 127 may generate data corresponding to the signal by using the pre-stored second look-up table T2. Here, the communication cable (e.g., the UTP cable) refers to a cable in which each pair of pieces not wrapped by an insulator is entangled and may include, for example, a direct cable, a cross cable, etc.

The second communication device 120 of the communication isolator 100 may generate a second communication signal TS2 by encoding or encapsulating the data corresponding to the signal and may transmit the second communication signal TS2 to the second control system 12.

The communication isolator 100 may convert the data and generate a communication signal by using the different look-up table T1 or T2 depending on the first or second control system 11 or 12. The communication isolator 100 may convert the received data by using the first and second look-up tables T1 and T2 and may not allow conversion of non-converted data into a communication signal.

The second communication signal TS2 may be converted into the data by being decoded or decapsulated in the second control system 12. In the second control system 12, a pump running state of a facility may be provided through a user interface. Through the second control system 12, a user may know a running state of a pump connected to the first control system 11. That is, the second control system 12 may provide a user interface with respect to the data obtained from the second communication signal TS2 transmitted through the communication isolator 100. The second control system 12 may be the central controller or a computer device in the security area and may not obtain a communication signal and/or data not generated through the communication isolator 100, but embodiments are not limited thereto. The second control system 12 may receive a running state of the pump connected with the first control system 11. When a signal satisfying a predetermined condition is sensed, the communication isolator 100 may convert the signal through a predetermined process and transmit the converted signal to another control system, so that data transmission and reception may be performed between the first control system 11 and the second control system 12 connected with each other through network communication.

Figure 4:
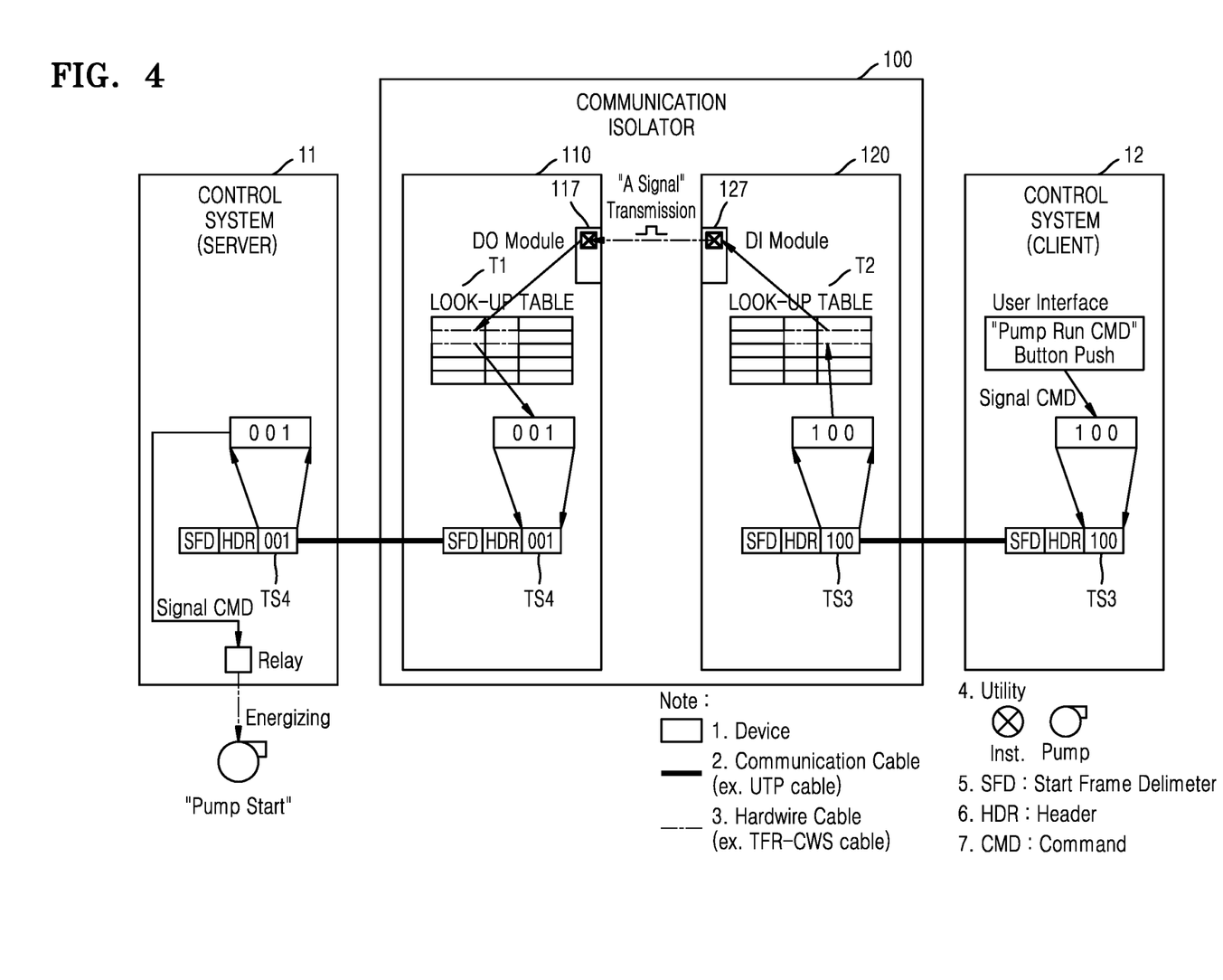
FIG. 4 is a diagram for describing a process in which a digital signal of a second control system is transmitted to a first control system through a communication isolator.

FIG. 4 is a diagram for describing a process in which a digital signal of the second control system 12 is transmitted to the first control system 11 through the communication isolator 100.

A transmission flow of the DO, which is a digital signal, may be performed from the first control system 11 to the first communication device 110, from the first communication device 110 to the second communication device 120, and then, from the second communication device 120 to the second control system 12. The first control system 11 may be connected with a pump of a power station device, etc. The DI may be transmitted from the second control system 12 to the second communication device 120, from the second communication device 120 to the first communication device 110, and then, from the first communication device 110 to the first control system 11. A user may generate an input on a pump running button through a user interface of the second control system 12. When the pump running button is input, the second control system 12 may convert the pump running input (a pump run DMD button push) into a command signal CMD and may generate a communication signal by encapsulating or encoding the command signal CMD. The second control system 12 may transmit the communication signal to the first control system 11 through the first and second communication devices 110 and 120.

The second communication device 120 of the communication isolator 100 may receive a third communication signal TS3 from the second control system 12 and may obtain data by decapsulating or decoding the third communication signal TS3 by using the pre-stored look-up table T2. The communication isolator 100 may transmit an electrical signal of the second control system 12 from the DI module of the second communication device 120 to the DO module of the first communication device 110. Here, the third communication signal TS3 refers to a signal transmitted from the second control system 12 to the communication isolator 100.

The first communication device 110 of the communication isolator 100 may generate a fourth communication signal TS4 by encoding or encapsulating the signal. Here, the fourth communication signal TS4 refers to a signal transmitted from the communication isolator 100 to the first control system 11.

The generated fourth communication signal TS4 may be transmitted to the first control system 11. The first control system 11 may obtain data by decoding or decapsulating the fourth communication signal T4. The first control system 11 may convert the data into a command signal and transmit the command signal to the pump. The pump running input received by the second control system 12 may be transmitted to the first control system 11 through the communication isolator 100 to run the pump of the first control system 11.

As described above, the command signal generated in the second control system 12, which is the central controller or the computing device in the security area, may be transmitted to the first control system 11 connected to an actual device (the pump, etc.) through the communication isolator 100.

Figure 5:
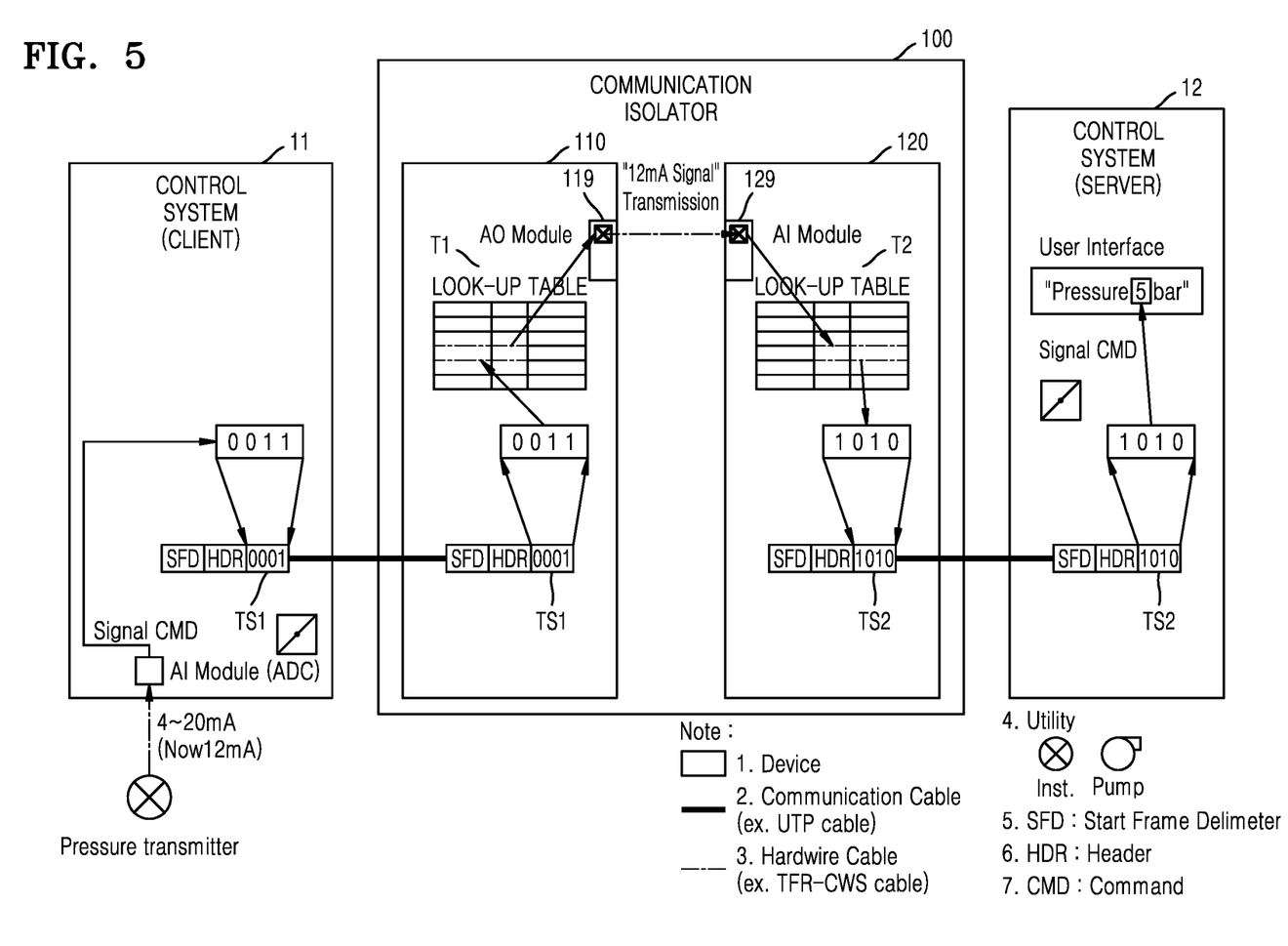
FIG. 5 is a diagram for describing a process in which an analog input signal is transmitted and received through a communication isolator.

FIG. 5 is a diagram for describing a process of transmitting and receiving an AI signal through the communication isolator 100.

In an AI signal processing process, the first control system 11 may be a client. When a pressure transmitter in a site measures a pressure value (for example, 5 Bar) of a predetermined magnitude, the pressure transmitter may transmit an electrical signal of a predetermined current value (for example, 20 mA) to the first control system 11.

The first control system 11 may receive measurement values, such as a level value, a temperature value, a water level value, etc., in addition to the pressure value, as analog signals, and these measurement values may be converted into corresponding current values, and analog signals of the corresponding current values may be generated. The measurement values may a temperature value, a level value, a water level value, a pressure value, a command value, a flow amount value, an analysis value, etc., but are not limited thereto and may include various values.

The analog output module 9a of the first control system 11 may convert a pressure value from a device in a site into a communication signal and transmit the communication signal to the communication isolator 100.

The first communication device 110 of the communication isolator 100 may generate data by decapsulating or decoding the first communication signal TS1. The communication isolator 100 may use the predetermined second look-up table T2 to quantize the analog signal to convert the analog signal into an electrical signal. The second look-up table T2 may include the current value of the analog signal, information about a relationship between the current value of the analog signal and data, or information about a signal reception module. The first communication device 110 of the communication isolator 100 may generate the electrical signal by using the second look-up table T2 and may transmit the electrical signal to the second communication device 120 through the AO module 119. "0011," which is data corresponding to a signal of 12 mA from among signals of 4 mA to 20 mA, may be transmitted to the AI module 129 of the second communication device 120 through a cable. The AI module 129 of the second communication device 120 may generate the second communication signal TS2 by encoding or encapsulating a received electrical signal "1010," by using a predetermined fourth look-up table and may transmit the second communication signal TS2 to the second control system 12. The first communication signal TS1 received from the first control system 11 and the second communication signal TS2 to be transmitted to the second control system 12 may be the same as each other, but are not limited thereto.

The second control system 12 may obtain data "1000" by decoding or decapsulating the received second communication signal TS2. The second control system 12 may obtain the pressure value through this process.

The second control system 12 may provide the pressure value through the user interface. The second control system 12 may provide the pressure value by displaying the pressure value as illustrated in FIG. 5.

Figure 6:
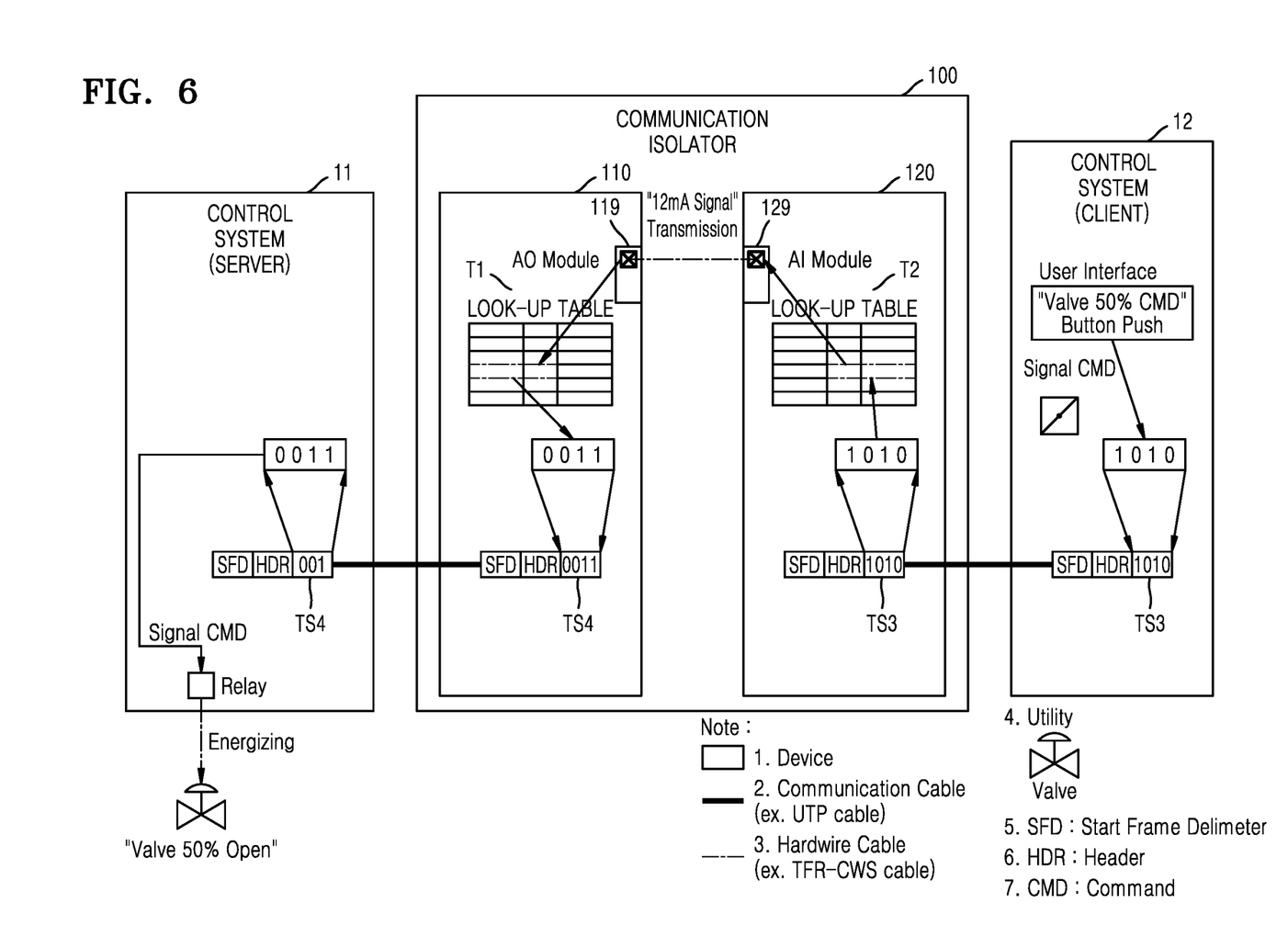
FIG. 6 is a view for describing a process in which an analog output signal is transmitted from a second control system to a first control system through a communication isolator.

FIG. 6 is a diagram for describing a process in which an AO is transmitted from the second control system 12 to the first control system 11 through the communication isolator 100.

A communication packet of the AO may be received from the second control system 12 in the form of a third communication signal TS3 and may be transmitted to the first control system 11 in the form of a fourth communication signal TS4. The third communication signal TS3 received from the second control system 12 and the fourth communication signal TS4 generated to be transmitted to the first control system 11 may be the same as each other.

A transmission flow of the AO may be reverse to a transmission flow of the AI. When a user manipulates a 50% open-valve command button through a user interface of the second control system 12, a signal corresponding to the 50% open-valve command may be generated via conversion.

A command signal CMD input by a user in the second control system 12 may be converted into the third communication signal TS3 to be transmitted to the communication isolator 100. The second control system 12 may convert the command signal CMD into the third communication signal TS3 by encoding or encapsulating the command signal CMD. The third communication signal TS3 may be converted by including a header, such as a start frame delimiter (SFD), a header (HDR), etc., but is not limited thereto.

The second control system 12 may transmit the third communication signal TS3 to the AI module 129 of the communication isolator 100. The AI module 129 of the second communication device 120 of the communication isolator 100 may obtain an electrical signal "1010" by decoding or decapsulating the received third communication signal TS3. The AI module 129 of the second communication device 120 may transmit the signal to the AO module 119 of the first communication device 110. The AO module 119 of the first communication device 110 may convert the received signal into data by using the second look-up table T2. The AO module 119 of the first communication device 110 may generate the fourth communication signal TS4 to be transmitted to the first control system 11, by encoding or encapsulating the data. Here, the data may be converted into a value readable by the first control system 11. The communication isolator 100 may convert the data and generate the communication signal by using the different second look-up table T2 depending on the first and second control systems 11 and 12 communicating with the communication isolator 100. The communication isolator 100 may convert the received data by using the second look-up table T2 and may not allow conversion of non-converted data into a communication signal.

The AO module 119 of the first communication device 110 may transmit the fourth communication signal TS4 to the first control system 11. The first control system 11 may obtain data by decoding or decapsulating again the received fourth communication signal TS4. The first control system 11 may transmit, to a valve, a command signal according to the data. A 50% open-valve command signal, as is input in the second control system 12, may be transmitted to a device connected with the first control system 11. In more detail, the command signal transmitted to the device may be energized through a relay module.

Examples of the command signal transmitted to the device may include a valve control signal, a pressure control signal, a temperature control signal, etc.

The first control system 11 may refer to a device equipped in a nuclear reactor, a power plant, a factory, a building, etc., but is not limited thereto and may include devices used in various industries.

In most industrial plants, multiple controllers are connected through communication and perform communication in real time, and through this communication, malicious effects, such as various viruses and hacking, etc. may be unintentionally transferred to cause severe damage. To prevent this phenomenon, a firewall, uni-directional communication, communication monitoring facilities, etc. are used.

When the communication isolator 100 according to embodiments is implemented, previous communication may be intactly maintained, and since, based on a principle of conversion of communication into an electrical signal, a user may not perform communication on signals except for predetermined signals, non-applied signals, such as viruses in both controllers, etc., may not access the communication. The communication isolator 100 may be additionally applied to previous industrial plants and may also be applied to new industrial plants, and thus, may have the future economic feasibility. Also, the communication isolator 100 may be miniaturized according to development in information and communications technology (ICT), and miniaturization and updating of the device are possible by using firmware and a system-on-chip (SoC). The disclosure is deemed to have a significant potential marketability in terms of the effectiveness in defending communication.

Figure 7:
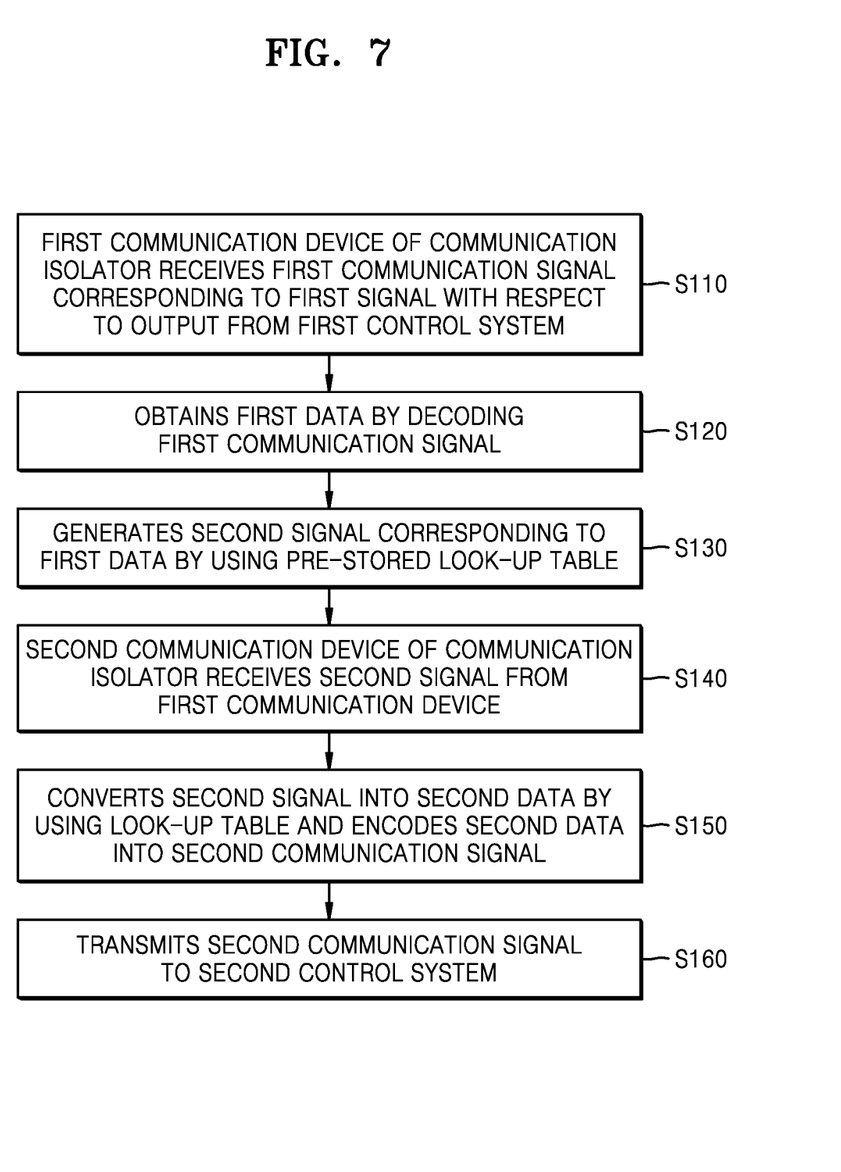
FIG. 7 is a flowchart of a method of isolating communication according to embodiments.

FIG. 7 is a flowchart of a method of isolating communication, according to embodiments.

In operation S110, the first communication device 110 of the communication isolator 100 may receive a first communication signal corresponding to a first signal with respect to an output from the first control system 11. Here, the output may include a pump value, a pressure value, a temperature value, a running state, a waver-level value, a command value, a flow amount value, an analysis value, etc., and the output may be based on a control signal generated in the control system. The output is not limited thereto and may include various values and signals.

In operation S120, the first communication device 110 may obtain first data by decoding the first communication signal.

In operation S130, the first communication device 110 may generate a second signal corresponding to the first data by using a pre-stored look-up table.

In operation S140, the second communication device 120 of the communication isolator 100 may receive a second signal from the first communication device 110.

In operation S150, the second communication device 120 may convert the second signal into second data by using the look-up table and may encode the second data into a second communication signal.

In operation S160, the second communication device 120 may transmit the second communication signal to the second control system 12.

According to an embodiment, the second communication device 120 may receive a third communication signal corresponding to a first command signal from the central controller. The second communication device 120 may convert the third communication signal into third data by decoding the third communication signal, may generate a third signal corresponding to the third data by using the look-up table, and may transmit the third signal to the first communication device 110. The first communication device 110 may convert the third signal into a fourth communication signal and may transmit the fourth communication signal to the external controller, and the external controller may generate a command signal corresponding to the fourth communication signal and may transmit the command signal to an external utility device.

The devices described above may be realized as a hardware component, a software component, and/or a combination of a hardware component and a software component. For example, the devices and the components described according to embodiments may be realized by using one or more general-purpose computers or specific-purpose computers, such as processors, controllers, arithmetic logic units (ALUs), digital signal (digital input signal (DI)) processors, micro-computers, field programmable gate arrays (FPGAs), programmable logic units (PLUs), microprocessors, or any other devices capable of executing and responding to instructions. The processing device may execute one or more software applications. The processing device may operate on an operating system (OS) or execute a software application realized in firmware. Also, the processing device may access, store, manipulate, process, and generate data in response to the software execution. For convenience of understanding, there is a case in which it is described that one processing device is used. However, it may be understood by one of ordinary skill in the art that the processing device may include a plurality of processing elements and/or a plurality types of processing elements. For example, the processing device may include a plurality of processors, or one processor and one controller. Also, other processing configurations, such as a parallel processor, may also be possible.

Software may include a computer program, a code, an instruction, or a combination of one or more thereof and may configure the processing device to operate as desired or individually or collectively instruct the processing device. Software and/or data may be permanently or temporarily embodied in a certain type of machine, a component, a physical device, virtual equipment, a computer storage medium or device, or a transmitted signal wave, so as to be interpreted by the processing device or to provide a command or data to the processing device. Software may be distributed on a computer system connected by a network and may be stored or executed in a distributed fashion. Software and data may be stored in one or more computer-readable recording devices.

The method according to an embodiment may be implemented in the form of a program command executable by various computer devices and may be recorded on a computer-readable medium. The computer-readable medium may include a program command, a data file, a data structure, etc. individually or in a combined fashion. The program command recorded on the medium may be specially designed and configured for an embodiment or may be well known to and usable by one of ordinary skill in the art. Examples of the computer-readable recording medium include magnetic media (e.g., hard discs, floppy discs, or magnetic tapes), optical media (e.g., compact disc-read only memories (CD-ROMs), or digital versatile discs (DVDs)), magneto-optical media (e.g., floptical discs), and hardware devices that are specially configured to store and carry out program commands (e.g., ROMs, random-access memories (RAMs), or flash memories). Examples of the program commands include a high-level language code executable by a computer by using an interpreter, etc., as well as a machine language code, such as the one made by a complier. The hardware device may be configured to operate via one or more software modules to perform the operations according to embodiments, or one or more software modules may be configured to operate the hardware device to perform the operations according to embodiments.

As described above, while embodiments are described with reference to the one or more embodiments and drawings, it is possible for one of ordinary skill in the art to variously modify and change the embodiments from this disclosure. For example, appropriate results may be achieved even when the described techniques are performed in a different order from the described method, and/or the described components, such as the system, structure, device, circuit, etc., are coupled or combined in a different form from the described method or replaced or substituted by other components or equivalents.

Therefore, other realized examples, other embodiments, and equivalents to the claims are also included in the scope of the claims set forth below.

According to embodiments, the operation integrity of a control system formed in an industrial site may be guaranteed by physically isolating communication between the control system formed in the industrial site and other external controllers.

Also, unlike a firewall based on a data diode, a commercialized technology, which provides uni-directional communication and minimizes damage, such as a virus, cyber terrorism, etc., it is possible to minimize damage, such as a virus, etc., while bi-directional communication is provided, according to embodiments.

Also, according to embodiments, it is possible to protect a central controller and an external controller from dangerous situation, such as a virus attack, cyber terrorism, etc. by blocking data transmission and reception by using a first communication device and a second communication device between the central controller and the external controller.

Also, according to embodiments, bi-directional communication between the central controller and the external controller is made possible by converting generated digital signals and/or analog signals into electrical signals and transmitting and receiving the electrical signals. Also, according to embodiments, the signals may be processed by converting the signals into electrical signals by using the first and second communication devices, and thus, sound signals may be transmitted and received without hindering bi-directional communication.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A communication isolator configured to perform network communication with a first control system and a second control system, the communication isolator comprising:
   a first communication device configured to receive a first communication signal corresponding to a first signal with respect to an output from the first control system, obtain first data by decoding the first communication signal, and generate a second signal corresponding to the first data by using a pre-stored look-up table; and
   a second communication device configured to receive the second signal from the first communication device, convert the second signal into second data by using the look-up table, encode the second data into a second communication signal, and transmit the second communication signal to the second control system,
   wherein the second communication device is further configured to receive a third communication signal corresponding to a first command signal from the second control system, convert the third communication signal into third data by decoding the third communication signal, generate a third signal corresponding to the third data by using the look-up table, and transmit the third signal to the first communication device, and
   the first communication device is further configured to convert the third signal into a fourth communication signal and transmit the fourth communication signal to the first control system, and the first control system is configured to generate a command signal corresponding to the fourth communication signal,
   wherein the first communication device is further configured to generate the second signal only for the predefined first data, and wherein the first communication device is further configured not to generate the second signal when there is no value in the look-up table corresponding to the first data, and
   wherein the second communication device is further configured to generate the third signal only for the predefined third data, and wherein the second communication device is further configured not to generate the third signal when there is no value in the look-up table corresponding to the third data.

2. The communication isolator of claim 1, wherein the first communication device and the second communication device are connected to each other by a hardwire cable and exchange a signal with each other.

3. The communication isolator of claim 1, wherein the output of the first signal corresponds to a measurement value or a control signal corresponding to the first signal.

4. The communication isolator of claim 1, wherein the first communication device or the second communication device is firmware.

5. A communication isolation method of a communication isolator configured to perform network communication with a first control system and a second control system, the communication isolation method comprising:
   receiving, via a first communication device of the communication isolator, a first communication signal corresponding to a first signal with respect to an output from the first control system;
   obtaining, via the first communication device, first data by decoding the first communication signal;
   generating, via the first communication device, a second signal corresponding to the first data by using a pre-stored look-up table;
   receiving, via a second communication device of the communication isolator, the second signal from the first communication device;
   converting, via the second communication device, the second signal into second data by using the look-up table and encoding, via the second communication device, the second data into a second communication signal; and
   transmitting, via the second communication device, the second communication signal to the second control system,
   receiving, via the second communication device from the second control system, a third communication signal corresponding to a first command signal;
   converting, via the second communication device, the third communication signal into third data by decoding the third communication signal, generating, via the second communication device, a third signal corresponding to the third data by using the look-up table, and transmitting, via the second communication device, the third signal to the first communication device; and converting, via the first communication device, the third signal into a fourth communication signal and transmitting, via the first communication device, the fourth communication signal to the first control system, and generating, via an external controller, a command signal corresponding to the fourth communication signal, wherein the first communication device is further configured to generate the second signal only for the predefined first data, and wherein the first communication device is further configured not to generate the second signal when there is no value in the look-up table corresponding to the first data, and wherein the second communication device is further configured to generate the third signal only for the predefined third data, and wherein the second communication device is further configured not to generate the third signal when there is no value in the look-up table corresponding to the third data.

6. The communication isolation method of claim 5, wherein the first communication device and the second communication device are connected to each other by a hardwire cable and exchange a signal with each other.

7. The communication isolation method of claim 5, wherein the output of the first signal corresponds to a measurement value or a control signal corresponding to the first signal.

8. A non-transitory computer-readable medium storing computer-executable program instructions that, when executed by a processor, cause the processor to perform operations including:

receiving, via a first communication device of the communication isolator, a first communication signal corresponding to a first signal with respect to an output from the first control system;

obtaining, via the first communication device, first data by decoding the first communication signal;

generating, via the first communication device, a second signal corresponding to the first data by using a pre-stored look-up table;

receiving, via a second communication device of the communication isolator, the second signal from the first communication device;

converting, via the second communication device, the second signal into second data by using the look-up table and encoding, via the second communication device, the second data into a second communication signal; and transmitting, via the second communication device, the second communication signal to the second control system, receiving, via the second communication device from the second control system, a third communication signal corresponding to a first command signal;

converting, via the second communication device, the third communication signal into third data by decoding the third communication signal, generating, via the second communication device, a third signal corresponding to the third data by using the look-up table, and transmitting, via the second communication device, the third signal to the first communication device; and converting, via the first communication device, the third signal into a fourth communication signal and transmitting, via the first communication device, the fourth communication signal to the first control system, and generating, via an external controller, a command signal corresponding to the fourth communication signal, wherein the first communication device is further configured to generate the second signal only for the predefined first data, and wherein the first communication device is further configured not to generate the second signal when there is no value in the look-up table corresponding to the first data, and wherein the second communication device is further configured to generate the third signal only for the predefined third data, and wherein the second communication device is further configured not to generate the third signal when there is no value in the look-up table corresponding to the third data.

* * * * *